No. 766,720. PATENTED AUG. 2, 1904.
C. W. MEINECKE.
CLINICAL THERMOMETER.
APPLICATION FILED NOV. 19, 1903.
NO MODEL.
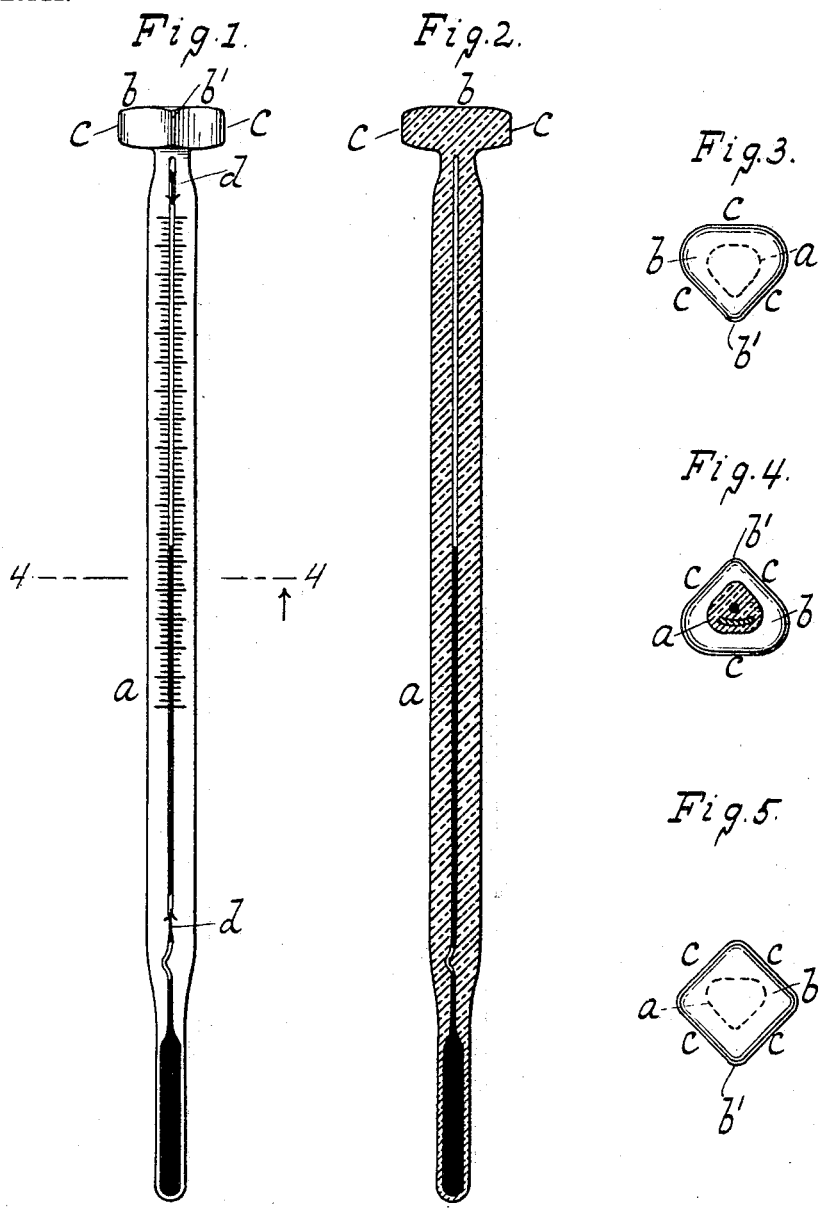
WITNESSES:
William Miller
Chas. E. P?
INVENTOR
Christian William Meinecke
BY
W. C. Hauff
ATTORNEY No. 766,720.    Patented August 2, 1904.

UNITED STATES PATENT OFFICE.

CHRISTIAN W. MEINECKE, OF JERSEY CITY, NEW JERSEY, ASSIGNOR TO MEINECKE & COMPANY, OF NEW YORK, N. Y., A CORPORATION OF NEW JERSEY.

CLINICAL THERMOMETER.

SPECIFICATION forming part of Letters Patent No. 766,720, dated August 2, 1904.

Application filed November 19, 1903. Serial No. 181,846. (No model.)

*To all whom it may concern:*

Be it known that I, CHRISTIAN W. MEINECKE, a citizen of the United States, residing at Jersey City, in the county of Hudson and State of New Jersey, have invented new and useful Improvements in Clinical Thermometers, of which the following is a specification.

In examining thermometers of this class the column of mercury is focused or held so that the lens portion will make the column appear magnified for easy reading. In shaking down the thermometer after a test to restore the mercury into the bulb, particularly if the hands of the nurse or physician or the stem of the instrument is wet or slippery, the thermometer may fly out of the hand and become broken. By having the stem provided with a head adapted to gage the lens or focus and which prevents slipping in shaking down the above objections are overcome and a practical device secured possessing advantages as set forth in the following specification and claims and illustrated in the annexed drawings, in which—

Figure 1 is a face elevation of a thermometer. Fig. 2 is a longitudinal section of Fig. 1. Fig. 3 is a plan view of Fig. 1. Fig. 4 is a section along 4 4, Fig. 1. Fig. 5 shows a modification.

The head being of one piece with or fused to the stem is secure, and no strange matter can lodge between the stem and head. The head is shown with a portion or angle $b'$ so located as to form a gage for focusing, and when holding the thermometer with the thumb alongside rest or gage $b'$ or the gage facing the physician or turned toward the user the lens or magnifying portion common in these instruments is turned to magnify the column for inspection.

In addition to gaging the focus as above described an arrow $d$ or pair of arrows can also be placed to point along the line which is to face the user when viewing the column. This arrow or arrows can be placed at the upper and lower portions of the stem, so as not to interfere with the inspection or be clear of the graduation-lines.

In Fig. 3 the head is shown of what might be called "triangular" form, or approximately so, with rounded corners. The head of Fig. 5 might be called "four-sided" with round corners.

In this invention the stem of the thermometer is provided with a head so shaped that the thermometer is prevented from rolling away when placed on its side. The stem of the thermometer $a$ is provided at its upper end with a head $b$, having rectilinear sides $c$. These sides have rounded corners to prevent chipping of the head, and by avoiding sharp angles accumulation of impurities is prevented. The head also keeps the stem elevated when the thermometer is placed on its side, thus allowing the same to be easily picked up when wanted. The head also can be conveniently grasped in shaking the mercury down into the bulb of the thermometer when the same has been displaced or run up by use or testing of temperature.

What I claim as new, and desire to secure by Letters Patent, is—

1. A thermometer having a stem provided at its end portion with a head made integral with the stem and having a flattened portion to prevent rolling, said head being of such size as to prevent the stem slipping when shaking down the thermometer and of greater diameter or cross-section throughout than the stem so that when the thermometer is laid down the head will hold the stem raised or at an incline to enable the same to be readily grasped.

2. A thermometer having a stem and a solid flattened head extending throughout at right angles with respect to the length of the stem and said head provided with a sharp or angular portion having its apex in line with the prism-front so as to act as a focusing gage portion to aid in focusing the column of the thermometer and prevent rolling.

3. A thermometer having a stem and a solid flattened head extending throughout at right angles with respect to the length of the stem and said head provided with a focus-indicator, said stem having arrows or marks at opposite ends of and on the focusing-line.

In testimony whereof I have hereunto set my hand in the presence of two subscribing witnesses.

CHRISTIAN W. MEINECKE.

Witnesses:
W. C. HAUFF,
CHAS. E. POENSGEN.